UNITED STATES PATENT OFFICE.

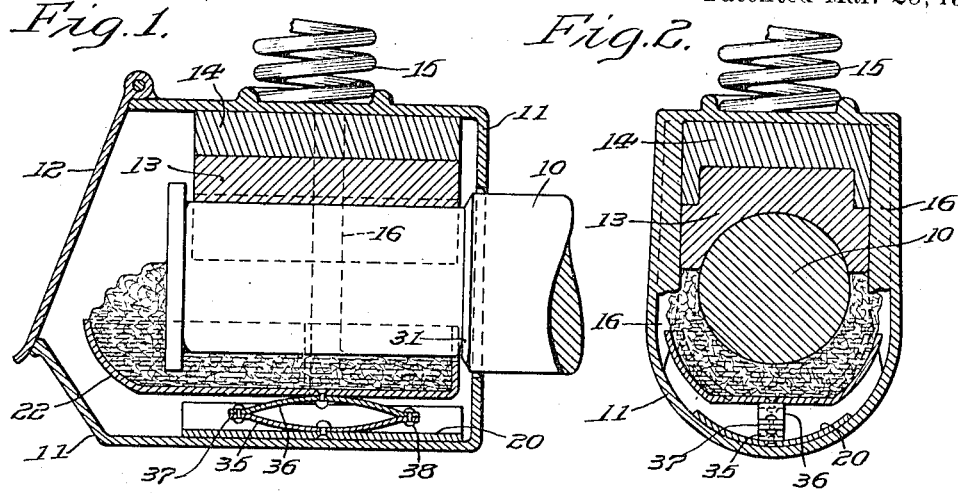

ROBERT DORNAN, 2D, OF WAYNE, PENNSYLVANIA.

JOURNAL-BOX-LUBRICATING DEVICE.

1,298,311.  Specification of Letters Patent.  Patented Mar. 25, 1919.

Application filed November 16, 1917. Serial No. 202,294.

*To all whom it may concern:*

Be it known that I, ROBERT DORNAN, 2d, a citizen of the United States, and a resident of Wayne, county of Delaware, and State of Pennsylvania, have invented new and useful Improvements in Journal-Box-Lubricating Devices, of which the following is a specification.

This invention relates to an automatic lubricating device primarily intended to be used with journal box constructions such as are used for example on railway cars, and has for its object to provide a self-contained unit adapted to be inserted into any of the usual forms of journal boxes without in any way modifying the same and to operate to automatically maintain the lubricant saturated waste constantly in contact with the axle of the bearing to insure the proper lubrication of the journal bearing as the oil is gradually dried out of the waste as is well known in the art. Furthermore it is an object of this invention to provide a structure which may be inserted in the various forms of journal boxes now in use when the car is jacked up and the axle partly removed from the box, but arranged so that the device, when once inserted in a journal box, may not readily be removed therefrom by unauthorized persons, since in order to do so it is necessary to likewise jack the car up in order to remove the axle and thus permit the lubricating device to be bodily removed therefrom.

Further objects of this invention are to provide an automatically operating lubricating device for journal boxes which is simple in construction and efficient in operation and which is so constructed throughout as to facilitate its adaptability for various forms of journal boxes and which may be readily inserted therein in the manner specified and which when in place does not interfere with the usual manner in which the journal box is packed with lubricating waste.

Further objects of this invention include the details of construction and arrangement of coöperating elements whereby the device may be cheaply manufactured and at the same time strong and durable as well as other features of construction which will appear from the specification and drawings forming a part thereof, in which Figure 1 is a longitudinal section with the axle in elevation showing one form of my invention in place in the journal box while Fig. 2 is a cross sectional view thereof. Figs. 3, 4 and 5 are partial sectional views corresponding to Fig. 1, each showing a different modification of this invention. Fig. 6 is a perspective view of the detachable unit constituting the essential novel automatic lubricating element of my invention.

In the drawings my invention is shown as applied to one form of journal box construction which has extensive use, but it is evident that my invention may be readily applied to various other forms of journal boxes. In Fig. 1, 10 represents the car wheel axle which carries the journal box as is well understood. One form of journal box includes the casing 11 provided with the usual hinged cover or door 12 through which access to the interior of the casing may be had to pack the box with lubricant saturated waste. The outer end of the axle 10 supports the usual brass 13 while a wedge plate 14, as is shown in the drawings, rests on top of the brass 13 and transmits the weight imposed on the upper surface of the housing 11 from the body of the car to the axle 10. A spring 15 is usually interposed between the truck bolster and the journal box, these features of construction being well-known in the art and not constituting a part of my invention. The journal box casing 11 is usually provided with vertically extending stiffening ribs 16 in order to strengthen the construction and in carrying my invention into effect, I have so shaped the automatically operating lubricating unit as to be readily inserted in the journal box, the vertical ribs 16 being availed of as means to facilitate the proper positioning of the device within the casing 11.

One form of detachable unit which is complete in itself and capable of automatically operating to constantly maintain the oil saturated waste in contact with the axle, is illustrated in Figs. 1, 2 and 6 wherein is shown a base plate or member 20 which is made to conform in contour with the bottom of the journal box 11, and furthermore, is made smooth and even throughout its length to facilitate its insertion into or removal from the journal box. Supported on the base plate 20 by a suitable spring construction, hereinbelow more fully described, is a waste pan 22, the shape of which is more clearly shown in Fig. 6, wherein it will be seen that the same is provided with a suitably curved front wall 23, side walls 24 and 25 and a rear wall or lip 26. It will be noticed that the rear end of the pan is somewhat reduced in size by reason of the offset portions 27 and 28 in the opposite side walls 24 and 25, thus forming a shoulder which may abut against the stiffening ribs 16 to limit the inward movement of the pan and properly locate the same within the journal box. It will be noted that the rear wall or lip of the pan 22 is cut away at 30 to receive the outer reduced end of the axle 10 adjacent the shoulder 31 thereof.

Interposed between the base plate 20 and the waste pan 22 is a spring element adapted to form the means for constantly pressing the pan and the waste supported therein against the axle 10. Various forms of spring elements may be readily used with my invention and in the form shown in Fig. 1 there is provided a pair of oppositely bowed leaf springs 35 and 36 secured together at their outer extremities at 37 and 38. The lower spring 35 is upwardly bowed, as shown, its ends terminating substantially midway between the base plate and the pan, the central portion of the same being secured to the base plate 20, as shown. The other spring 36 is secured at its middle portion to the pan 22 and it is a feature of my invention to so secure the spring element to both the base plate 20 and pan 22 as to leave the lower surface of the base plate 20 and the inner bottom surface of the pan 22 perfectly smooth, or substantially so, for purposes as will hereinafter appear.

In Figs. 3, 4 and 5 are illustrated different forms of spring elements interposed between the base plate and the waste pan 22. In Fig. 3 a single spring 40 extending longitudinally of the base plate 20 and pan 22 is secured at 41 to the pan 22 in a manner substantially the same as is the spring 36 shown in Fig. 1. The lower outer ends of the spring 40 in Fig. 3 are provided with slots 42 and 43 through which are passed the rivets or bolts 44 and 45 for retaining the ends of the spring in position on the base plate 20 but at the same time permitting the spring during operation to move relatively thereto.

In Figs. 4 and 5, is shown a plurality of springs located at various positions on the base plate 20. In Fig. 4 is shown three spring elements 50, 51 and 52, the form of the same corresponding substantially to the form of spring unit illustrated in Figs. 1 and 2 but located transversely of the waste supporting and automatically operating lubricating device, while in Fig. 5 there is illustrated a plurality of coil springs 53, 54 and 55 suitably secured to the bottom plate 20 and waste pan 22.

From the foregoing description of my invention it is thought that the operation of the device will be readily understood. The lubricating unit comprised of the base plate 20, spring element and waste supporting pan 22 is readily inserted within the journal box 11 after the car is jacked up and the axle 10 partly withdrawn therefrom so as to permit the rear lip 26 to be slid under the flange on the outer extremity of the axle 10, the base plate 20 at the same time sliding through the opening in the journal box closed by the door 12 and along the bottom of the box 11 until the shoulders or offset portions 27 and 28 on the side walls of the pan 22 contact with the stiffening rib 16 which thus limit the inward movement of the pan 22. The axle may now be reinserted in the journal box 11, the brass 13 and wedge 14 properly located thereon and the weight of the car brought down on the same through the box 11 as will be readily understood. The pan 22 may now be packed with the oil saturated waste in the usual manner whereby the pan 22 will be forced toward the base plate 20 compressing the spring element shown in the bowed springs 35 and 36 in Fig. 1, the spring 40 in Fig. 3, the several bowed springs of Fig. 4 or the coiled springs illustrated in Fig. 5. It will be readily understood that as the oil is taken up from the waste by the axle and journal bearing and the waste dries out, the spring elements act to raise the pan 22 relatively to the axle 10 and thus constantly keep the same and the waste material packed therein in proper position to efficiently lubricate the journal bearing. At the same time the lip 26 at the rear of the pan 22 operates to prevent the oil from running out of the rear of the journal box through the opening around the axle 10. Attention is particularly called to the fact that the form of springs shown in Fig. 4 would permit the front spring 50 to be compressed more than the other springs during the process of packing the journal to thus insure a complete packing of the journal throughout the entire area of the same from front to rear of the pan 22.

Attention is called to the fact that the removable automatically operating lubricating device may be entirely made of sheet metal and thus cheaply manufactured and properly shaped to conform with any form of journal box construction on the market and that the device may be easily placed in operative position by those persons authorized to do so and provided with the necessary implements therefor while at the same time the device cannot be removed therefrom by unauthorized persons who would not ordinarily be provided with the necessary apparatus to jack a car up which would be necessary before the pan could be removed from the journal box. Furthermore, it is apparent that the journal box itself is not modified in any way and my device is entirely self-containing and complete in itself, thus facilitating its adaptability with already existing forms of construction of journal boxes, the device being capable of use in the ordinary manner as the smooth bottomed pan 22 does not interfere with the insertion and packing of the waste, while the bottom of the base plate 20, being also smooth and conforming with the shape of the base of the casing 11, forms a substantial bearing for the device when located in the journal box as well as facilitating its insertion and withdrawal. The rear lip 26 operates as means to prevent the lubricating oil or waste from running out of the rear end of the journal box, thus overcoming a difficulty frequently experienced in journal box constructions, the device, as a whole, operating as an efficient self-contained unit for the purposes intended.

Having thus described my invention I claim and desire to protect by Letters Patent of the United States:

1. The combination of a standard journal box having an interior basal portion and provided at its lower portion with a front wall spaced from the end of the axle, and a journal box lubricating device comprising a base member adapted to be arranged upon the basal portion of the journal box, a waste supporting pan located beneath the axle and having a front wall extending upward at the end of the axle above the bottom of the same, and resilient means interposed between the base member and the pan and yieldably pressing the said pan upwardly for holding waste against the axle and connecting the pan and the base member to form a single unit, the space between the front wall of the journal box and the end of the axle being sufficiently constricted to prevent the withdrawal of the lubricating device while the journal box and the axle are in their normal working position.

2. The combination of a standard journal box having an interior basal portion and provided at its lower portion with a front wall spaced from the end of the axle, and a journal box lubricating device comprising a base member adapted to be arranged upon the basal portion of the journal box, a waste supporting pan located beneath the axle and having the front end wall extended above the bottom of the axle, and spring supporting means interposed between the pan and the base member and permanently connecting the same to form a single unit of the lubricating device, said spring yieldingly pressing the pan upwardly to maintain the waste against the axle and the space between the front wall of the journal box and the end of the axle being sufficiently constricted to prevent the removal of the lubricating device when the journal box and the axle are in their normal working position.

3. The combination of a standard journal box having an interior basal portion and provided at its lower portion with a front wall spaced from the end of the axle, said journal box being also provided with vertically disposed ribs located above the basal portion, and a lubricating device comprising a base member adapted to be arranged upon the base portion of the journal box, a waste supporting pan located beneath the axle and being reduced in width at its rear portion to form opposite shoulders to coact with the vertical ribs for guiding the pan, and resilient supporting means interposed between the base member and the pan for urging the latter upwardly to hold the waste against the axle, the space between the front end wall of the journal box and the end of the axle being sufficiently constricted to prevent the removal of the lubricating device when the said journal box and axle are in their normal working position.

4. The combination of a standard journal box having an interior basal portion and provided at its lower portion with a front wall spaced from the end of the axle, said journal box being also provided with vertically disposed ribs located above the basal portion, and a lubricating device comprising a base plate fitting against and conforming to the configuration of the basal portion, a waste supporting pan located beneath the axle and having a front wall extending upward above the bottom of the axle, the rear portion of the pan being reduced in width to form shoulders to coact with the said ribs for guiding the pan, and spring supporting means interposed between the pan and the base plate and connecting the same to form a single unit, the space between the front wall of the journal box and the end of the axle being sufficiently constricted to prevent the removal of the lubricating device when the journal box and the axle are in their normal working position.

In witness whereof, I have hereunto set my hand this 14th day of November, A. D. 1917.

ROBERT DORNAN, 2D.